US012701642B2

(12) United States Patent (10) Patent No.: US 12,701,642 B2
Katzir et al. (45) **Date of Patent: \*Aug. 4, 2026**

(54) LIGHT DRIVER CALIBRATION

(71) Applicant: AES Global Holdings PTE Ltd.,
Singapore (SG)

(72) Inventors: Liran Katzir, Tel Aviv (IL); Tal Tayar,
Tel Aviv (IL); Nikolay Truchni,
Nahariya (IL); Dror Salony, Zichron
Yakov (IL)

(73) Assignee: AES Global Holdings PTE Ltd.,
Singapore (SG)

( * ) Notice: Subject to any disclaimer, the term of this
patent is extended or adjusted under 35
U.S.C. 154(b) by 285 days.

This patent is subject to a terminal dis-
claimer.

(21) Appl. No.: 18/477,006

(22) Filed: Sep. 28, 2023

(65) Prior Publication Data

US 2024/0023213 A1    Jan. 18, 2024

Related U.S. Application Data

(63) Continuation of application No. 17/451,248, filed on
Oct. 18, 2021, now Pat. No. 11,864,280.

(51) Int. Cl.
 *H05B 45/14* (2020.01)
 *H04N 23/74* (2023.01)
 *H05B 45/18* (2020.01)
 *H05B 45/3725* (2020.01)

(52) U.S. Cl.
 CPC .............. *H05B 45/14* (2020.01); *H04N 23/74*
 (2023.01); *H05B 45/18* (2020.01); *H05B*
 *45/3725* (2020.01)

(58) Field of Classification Search
 CPC .... H05B 45/14; H05B 45/18; H05B 45/3725;
 H05B 45/32; H05B 45/54; H04N 23/74
 See application file for complete search history.

(56) References Cited

U.S. PATENT DOCUMENTS

| | | | |
|---|---|---|---|
| 10,136,488 B1 | 11/2018 | Kwon et al. | |
| 2013/0169172 A1* | 7/2013 | Kesterson | H05B 45/38 |
| | | | 315/186 |
| 2014/0117964 A1 | 5/2014 | Walters et al. | |

FOREIGN PATENT DOCUMENTS

| | | |
|---|---|---|
| CN | 110418449 A | 11/2019 |
| TW | 201103373 A | 1/2011 |

\* cited by examiner

*Primary Examiner* — Yogesh K Aggarwal

(57) ABSTRACT

A charge voltage calibration system comprising a power
supply, a plurality of light sources coupled in series, and a
driver coupled to the power supply and to the plurality of
light sources. The driver includes a capacitor, a switch, and
a sense resistor. The switch, the sense resistor, and the
plurality of light sources are coupled in series to form a
discharge path. The discharge path is coupled in parallel
with the capacitor. The charge voltage calibration system
also comprises a controller configured to cause the power
supply to supply a first charge voltage to the driver and to
cause the switch to transition from an off state to an on state
to discharge at least a portion of a first stored energy in the
capacitor through the plurality of light sources.

20 Claims, 6 Drawing Sheets

- PRIOR ART -

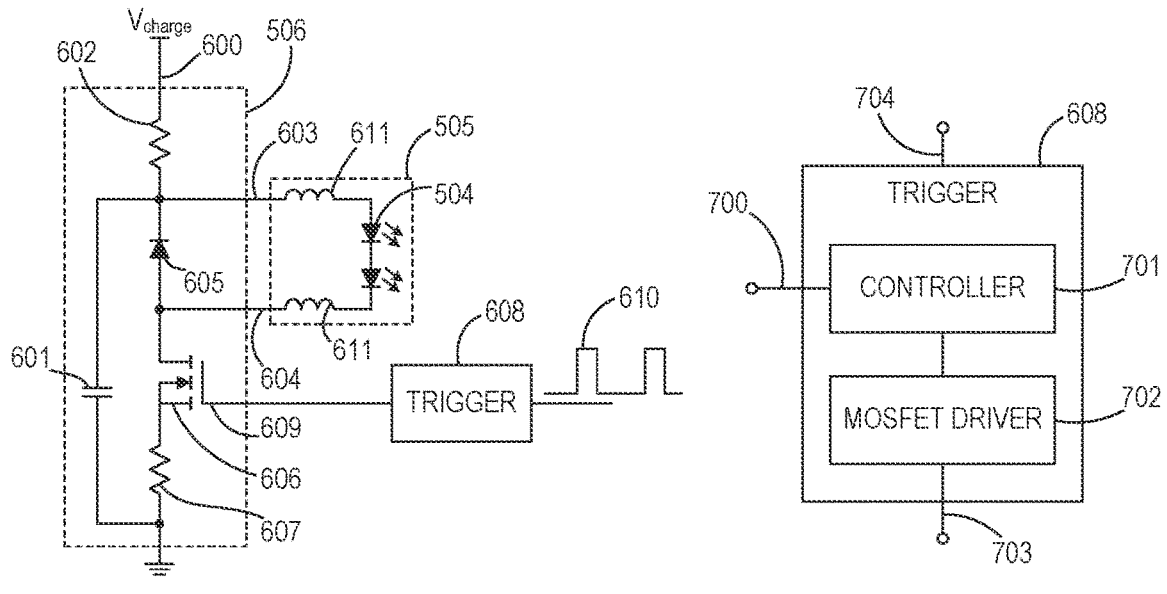
FIG. 6
FIG. 7
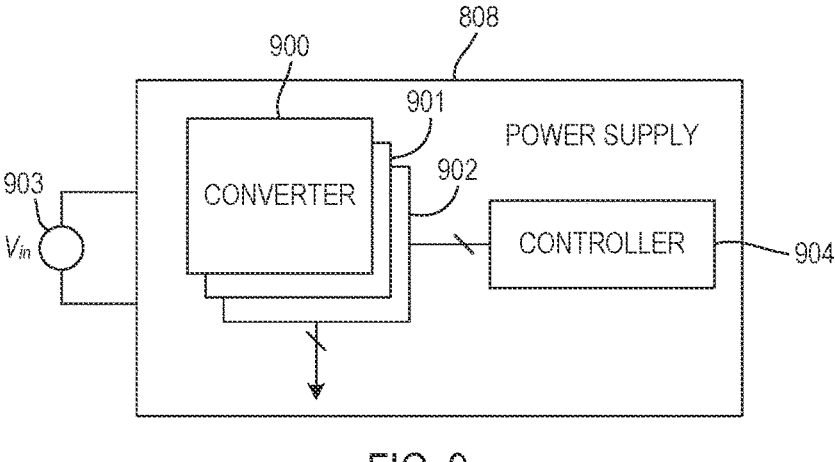
FIG. 9
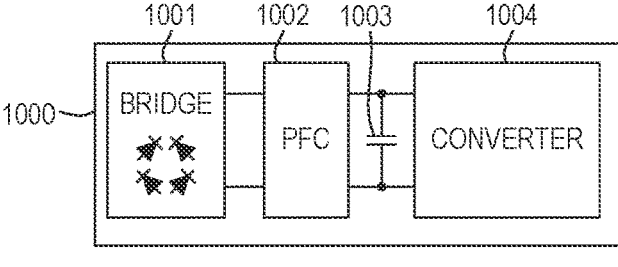
FIG. 10

LIGHT DRIVER CALIBRATION

CROSS-REFERENCE TO RELATED APPLICATION

This application is a continuation of U.S. patent application Ser. No. 17/451,248, filed Oct. 18, 2021. The entire contents of the above application is incorporated herein by reference.

TECHNICAL FIELD

Aspects of the disclosure relate to machine vision systems and more particularly to illuminating a target area via a plurality of light sources.

BACKGROUND

Machine vision systems may be used to identify aspects of a target area for inspection. The target area may be inspected to identify, for example, defects in an object surface or other features such as object positioning relative to the surface.

FIG. 1 illustrates bright field imaging according to an example. An inspection object 100 has a surface 101, which is positioned for inspection by a machine vision system 102. The machine vision system 102 includes a camera 103 having a field-of-view (FOV) directed to a target area 104 on the surface 101 for inspection. One or more light sources 105 are positioned to direct light 106 toward the surface 101 for reflection back toward the camera 103, which may capture video and/or still images of the target area 104 for inspection by a machine process or by a technician.

FIGS. 2 and 3 illustrate dark field imaging according to an example where the light sources 105 are positioned closer to the inspection object 100 so that their light strikes the surface 101 at a low angle. As illustrated in FIG. 2, if nothing on the surface 101 interrupts the light rays, very little or none of the light is reflected toward the camera. In this case, an image of mostly black or all black pixels may be captured. However, as illustrated in FIG. 3, a surface feature 107 such as an imperfection or an intentional design element may reflect some of the light from the light sources 105 toward the camera 103. As such, an image of the surface feature 107 surrounded by black pixels may be generated, highlighting the surface feature 107 in the image.

Bright field or dark field imaging may benefit from high power illumination from the light sources 105. In some embodiments, the light sources 105 may form a string 108 of light constructed from a plurality of individual light sources 105 arranged in a ring around the target area 104 as illustrated in FIG. 4. Light sources such as light-emitting diodes (LEDs) may be used and may be connected in series to create a string of lights operated from a single driver 109.

The LEDs 105 may provide high power illumination by being driven at a higher current than their nominal current ratings for a short period of time. For example, the LEDs 105 may be driven at more than ten times their nominal current rating with a short burst of current. However, internal resistances and parasitic inductances of the string of LEDs can accumulate to a significant amount that can affect the rise and fall times of the pulses meant to quickly pulse the light sources 105. As a result, the amount of light generated in response to an illumination pulse may be less than a desired amount of illumination.

Overview

In accordance with one aspect of the present disclosure, a charge voltage calibration system comprising a power supply, a plurality of light sources coupled in series, and a driver coupled to the power supply and to the plurality of light sources. The driver includes a capacitor, a switch, and a sense resistor. The switch, the sense resistor, and the plurality of light sources are coupled in series to form a discharge path. The discharge path is coupled in parallel with the capacitor. The charge voltage calibration system also comprises a controller configured to cause the power supply to supply a first charge voltage to the driver and to cause the switch to transition from an off state to an on state to discharge at least a portion of a first stored energy in the capacitor through the plurality of light sources.

In accordance with another aspect of the present disclosure, a method of calibrating illumination generated by a plurality of light sources comprises controlling a power supply to output a first charge voltage to a light string driver coupled to the plurality of light sources and storing a first capacitor voltage in a storage capacitor of the light string driver based on the first charge voltage. The method also comprises controlling a switch of the light string driver into a conduction state to discharge at least a portion of the first capacitor voltage stored in the storage capacitor through the plurality of light sources, through the switch, and through a sense resistor and comparing a reference voltage with a resistor discharge voltage, the resistor discharge voltage generated across the sense resistor in response to the discharge of the at least a portion of the first capacitor voltage.

BRIEF DESCRIPTION OF THE DRAWINGS

The drawings illustrate embodiments presently contemplated for carrying out the invention.

In the drawings:

FIG. 6 illustrates a schematic diagram of a light string/driver arrangement according to this disclosure.

FIG. 7 illustrates a block diagram of a trigger according to this disclosure.

FIG. 9 illustrates a block diagram of a power supply according to this disclosure.

FIG. 10 illustrates a block diagram of a converter according to this disclosure.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
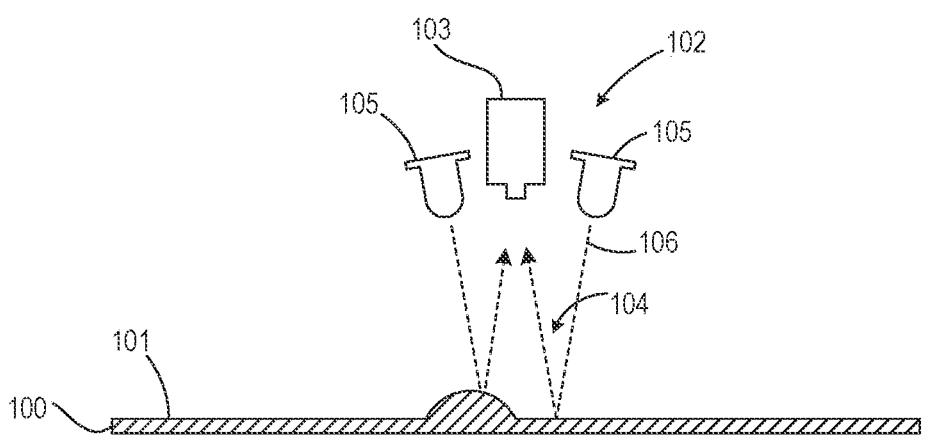
FIG. 1 illustrates a known technique for bright field imaging.
Figure 2:
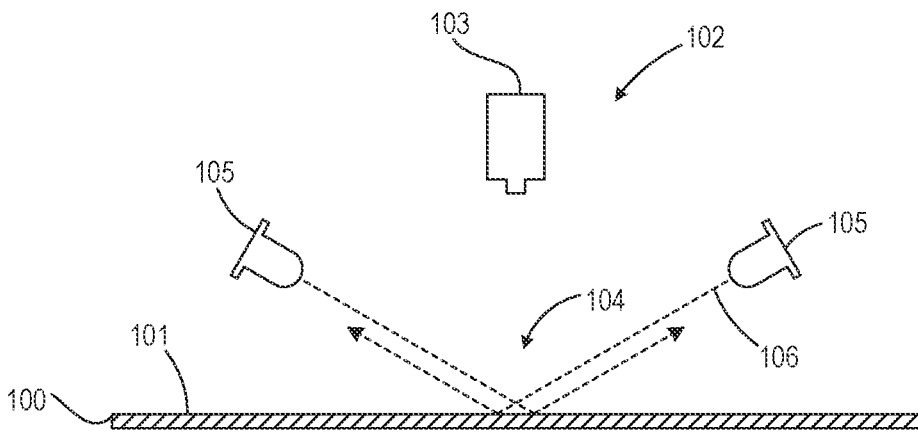
FIGS. 2-3 illustrate a known technique for dark field imaging.
Figure 3:
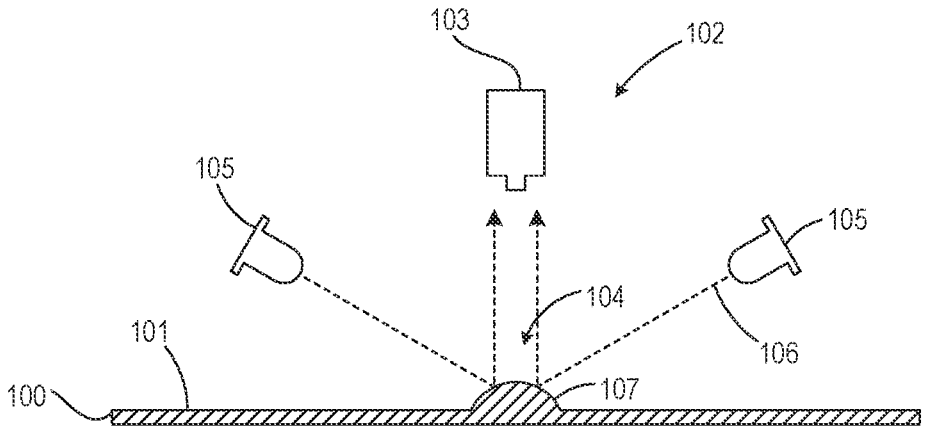
Figure 4:
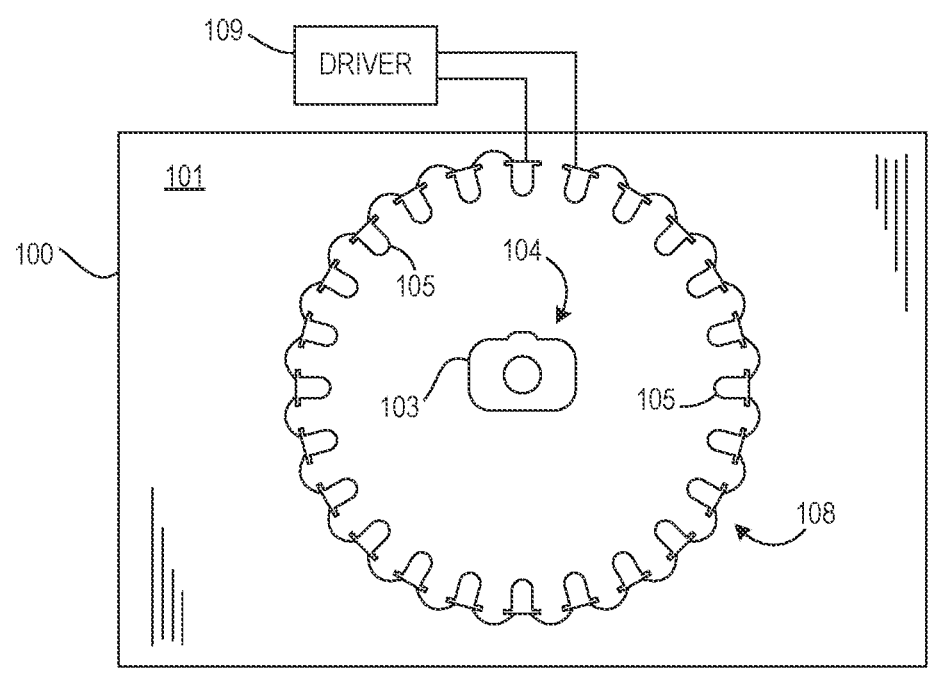
FIG. 4 illustrates a known light string arrangement for a machine vision system.
Figure 5:
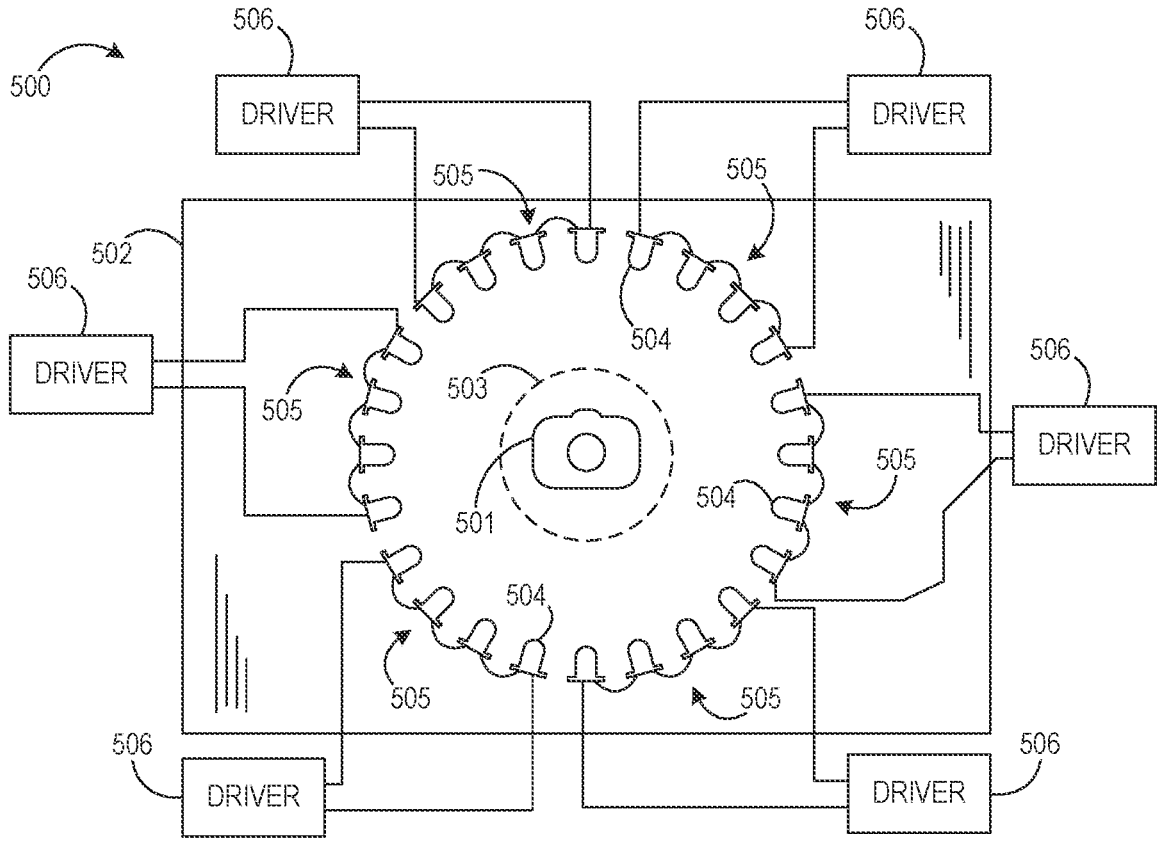
FIG. 5 illustrates a light string arrangement for a machine vision system according to this disclosure.

FIG. 5 illustrates a machine vision system 500 according to an example. A camera 501 is positioned above an inspection object 502 having a target area 503 desired to be imaged. A ring of light sources 504 surrounds the target area 503 and includes a plurality of LEDs in one example. In contrast to the light sources 105 illustrated in FIG. 4 where a single series-connected ring of light sources provides illumination for the imaging, the ring of light sources 504 in the machine vision system 500 of FIG. 5 includes multiple series-connected light sources (e.g., strings 505) with a fewer number of light sources in each string 505 than the number of light sources in the string 108 of light sources 105. Reducing the number of light sources in each string 505 by a factor of n as compared with the number of light sources in the string 108 can reduce the rise time and fall time of the driving pulses by $n^2$.

Each LED string 505 has a respective driver 506 coupled thereto for driving current through the LED string 505. FIG. 6 illustrates a schematic diagram of a driver 506 coupled to an LED string 505 according to an embodiment. The driver 506 includes an input 600 configured to receive a charge voltage for charging a discharge capacitor 601. A charge resistor 602 is serially coupled between the discharge capacitor 601 and the input 600. An anode end 603 of the LED string 505 is connected to the node between the discharge capacitor 601 and the charge resistor 602, and a cathode end 604 of the LED string 505 is coupled in parallel with a clamp diode 605. A switch 606 such as a metal-oxide-semiconductor field-effect transistor (MOSFET) is coupled to the cathode end 604 of the LED string 505 and, when controlled into an on or conducting state, provides a current flow discharge path through the LED string 505 for energy stored in the discharge capacitor 601. When the switch 606 is controlled into the off or non-conducting state, current is prevented from flowing through the LED string 505. The current flow discharge path may further include a current measurement resistor 607 for measuring the current flowing through the LED string 505 as described herein.

A trigger 608 is coupled to a control terminal 609 (e.g., a gate) of the switch 606, and a signal 610 received by the trigger 608 causes the trigger 608 to control the switch 606 into its on and off states. The signal 610 may have one or more pulses that cause the trigger 608 to control the switch 606 into a desired conduction state. For example, an active high signal may cause the trigger 608 to control the switch 606 into its off state in response to the signal 610 being low and into its on state in response to the signal 610 being high. In this manner, a single high pulse of a desired illumination time may be sent in the signal 610 to the trigger 608 to control the switch 606 from its off state into its on state for the duration of the high pulse and back into its off state thereafter. Other configurations of the signal 610 for instructing the trigger 608 to control the switch 606 are contemplated herein such as an active low signal, a pulse-width modulation (PWM) signal, an operation code (op-code) signal, etc.

By applying a charge voltage, $V_{charge}$, to the input 600 and controlling the switch 606 into its off state, the discharge capacitor 601 can be charged to the charge voltage. Illumination of the LED string 505 can occur by controlling the switch 606 into its on state such that energy stored in the discharge capacitor 601 is discharged through the LED string 505. In one example, only a portion of the energy stored in the discharge capacitor 601 is expended during the illumination time. In another example, all the energy stored in the discharge capacitor 601 is expended during the illumination time.

The schematic of the LED string 505 in FIG. 6 illustrates conductor winding symbols 611 meant to highlight the parasitic inductance inherent in the LED string 505 but are not components (e.g., inductors) physically coupled in series with the light sources 504. Like a physical inductor, this parasitic inductance opposes any change in current flowing through the LED string 505. Accordingly, the parasitic inductance affects the time it takes for the current flow through the LED string 505 to increase (e.g., rise time) or decrease (e.g., fall time) from a starting current flow value to a second current flow value. For example, starting from zero flow through the LED string 505, the parasitic inductance affects the rise time of the current flow to reach a target level such as a level sufficient to produce illumination from the light sources 504.

Accumulation of the parasitic inductances of the serially-connected light sources 504 can lead to undesirable rise and fall times of the pulses of the signal 610 meant to quickly pulse the light sources 504. Accordingly, a plurality of LED strings 505 with fewer light sources 504 in each string triggered to provide simultaneous or near-simultaneous illumination can be preferable to the same number of light sources 504 coupled together in a single serial connection.

FIG. 7 illustrates a schematic block diagram of the trigger 608 according to an example. The trigger 608 includes a signal input terminal 700 for receiving the signal 610 and transmitting the signal 610 to a controller 701. In response to receiving a trigger pulse of the signal 610 indicating that the switch 606 should be controlled into its conduction state, the controller 701 controls a driver 702 (e.g., a MOSFET driver) to supply a conduction command signal on a trigger output terminal 703 connected to the control terminal 609 of the switch 606. The conduction command signal is based on an input voltage supplied to an input voltage terminal 704 of the trigger 608 and supplies a voltage to the control terminal 609 sufficient to turn the switch 606 on. In the absence of the trigger pulse of the signal 610, the controller 701 controls the driver 702 to supply a non-conduction command signal to the control terminal 609 of the switch 606. Based on the non-conduction command signal, the switch 606 is controlled into or remains in the off state.

Figure 8:
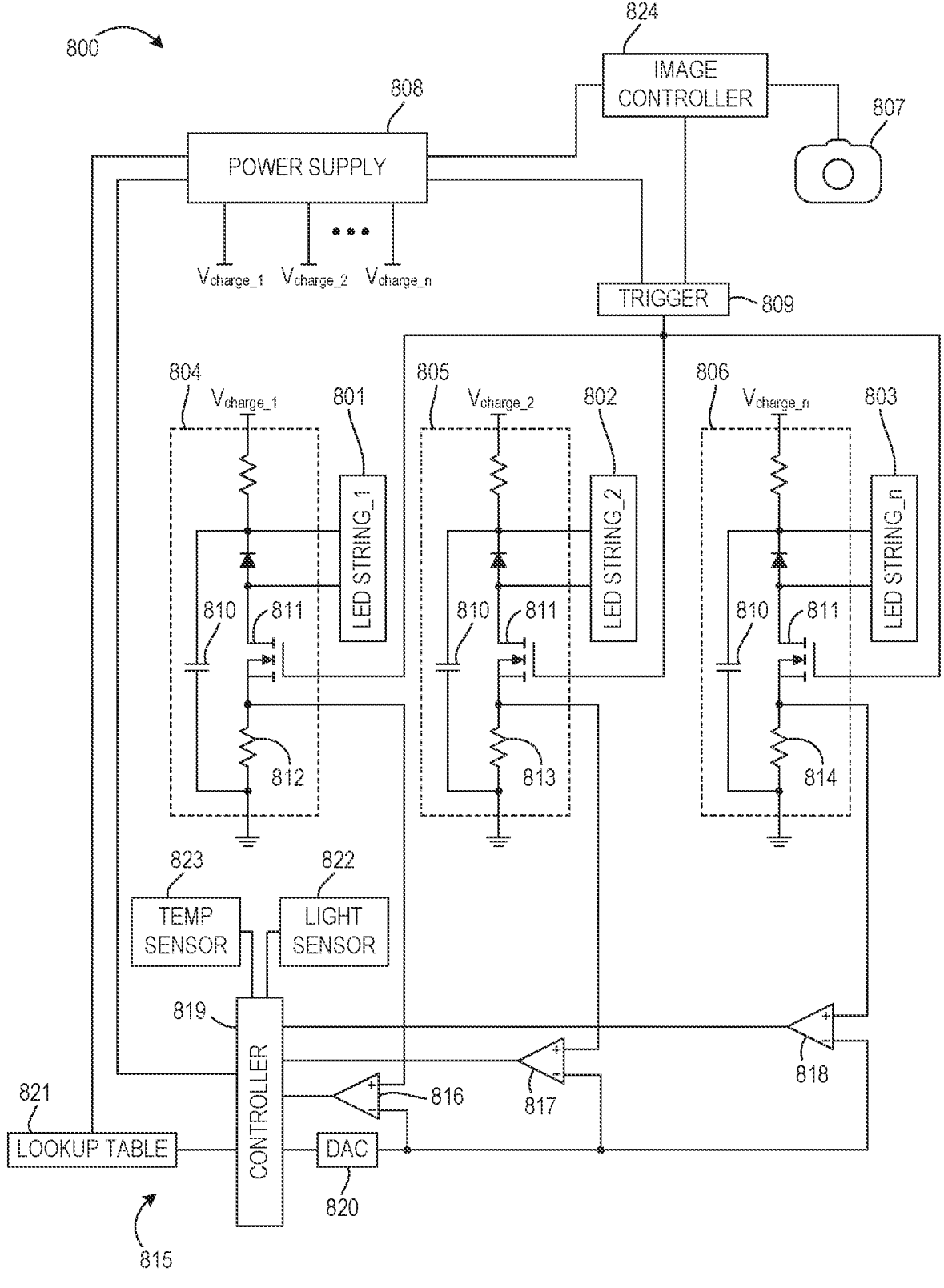
FIG. 8 illustrates a according to this disclosure.

FIG. 8 illustrates a diagram of a multi-string illumination system 800 according to an embodiment. The LED strings 801-803 of a plurality of LED strings are coupled to respective drivers 804-806 for providing illumination. The LED strings 801-803 may be arranged as illustrated in FIG. 5 about a target area 503 for illuminating the target area 503 for image capture by a camera 807. While FIG. 5 illustrates the same number of light sources 504 in each string 505, the number of light sources in each of the LED strings 801-803 may be the same or may be different.

The multi-string illumination system 800 includes a power supply 808 coupled to the drivers 804-806 for providing the charge voltages thereto. FIG. 9 illustrates a block diagram of an exemplary power supply 808 according to an example. As shown, the power supply 808 includes a plurality of voltage converters 900-902, each converter configured to convert an input voltage supplied by a voltage source 903 into a charge voltage for one or more of the drivers 804-806 of FIG. 8. In one example, each converter 900-902 is coupled to only one of the drivers 804-806 for providing a charge voltage tailored for the respective LED string 801-803 coupled to the driver. The power supply 808 also includes one or more controllers 904 for controlling the voltage converters 900-902 to provide the charge voltages. As shown in FIG. 9, a single controller 904 is coupled to the plurality of voltage converters 900-902; however, it is contemplated that each voltage converter 900-902 may have its own respective controller 904 for controlling its voltage conversion operation.

FIG. 10 illustrates a schematic block diagram of a voltage converter 1000 that may be implemented by one or more of the voltage converters 900-902 of FIG. 9 according to an example. The voltage converter 1000 is an AC-to-DC converter including a voltage rectification bridge 1001 configured to convert incoming AC voltage into a first DC voltage. A power factor correction (PFC) block 1002 corrects a power factor of the first DC voltage and provides a second DC voltage for charging a bulk capacitor 1003. A DC-to-DC converter 1004 converts the second DC voltage into a charge voltage supplied to the one or more drivers 804-806 coupled to the power supply 808 (FIG. 8). The DC-to-DC converter 1004 may include any suitable DC-to-DC switching converter topology. For example, the DC-to-DC converter 1004 may have buck, boost, forward, double forward, flyback, push-pull, half-bridge, full-bridge, etc. topologies (including their resonant counterparts where applicable). The half-bridge and the full-bridge topologies may be phase-shifted, hard-switching, etc. Additionally, the DC-to-DC converter 1004 may include isolated or non-isolated converter topologies.

Referring back to FIG. 8, the controller(s) 904 (FIG. 9) of the power supply 808 is coupled to a trigger 809 for controlling the drivers 804-806 as described herein for discharging the stored energy in the driver discharge capacitors 810 through the LED strings 801-803. In the illustrated embodiment, the single trigger 809 is configured to command the driver switches 811 of each of the drivers 804-806 into their on and off states in response to receiving a signal (e.g., signal 610 of FIG. 6) from the power supply 808.

In some machine vision applications, it is beneficial to have high-intensity light directed toward a single target area for image capture. In one scenario for providing high-intensity light, short pulses within the trigger signal 610 may be designed to quickly turn the switches 811 on and off for a brief illumination time of the LED strings 801-803. While a plurality of LED strings having fewer serially-coupled light sources in each string may benefit from a lower parasitic capacitance as compared with a single string having the same total number of light sources, illumination of the target area for image capture may further benefit from a synchronization of the intensity of light provided by each LED string. Due to alteration factors such as age and temperature, the intensity of light generated by an LED light source supplied by a fixed voltage may vary. For example, the age of a light source may vary a resistance of the light source such that a different current is caused to flow through the light source with the same voltage applied to the light source at the beginning of its operational life as at a time point later in its operational life. With the different current comes different illumination intensity. Synchronization of the current flowing through each LED string 801-803 to a common value helps to unify the light intensity among the LED strings 801-803 so that differences in the amount of illumination provided by the LED strings may be minimized.

Figure 11:
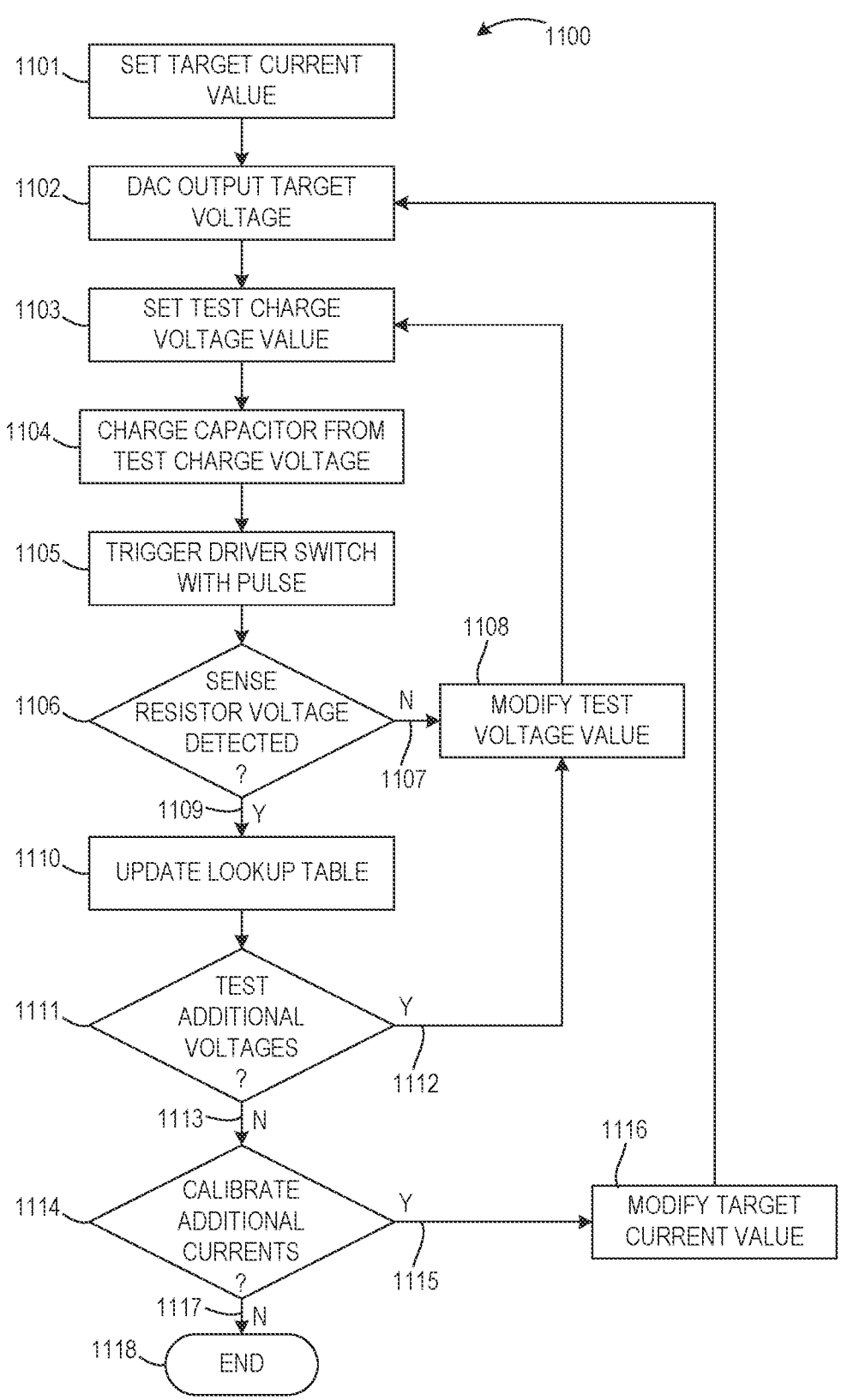
FIG. 11 illustrates a calibration procedure according to this disclosure.

FIG. 11 illustrates a calibration procedure 1100 for setting a charge voltage for an LED string to yield a target current according to an example. Referring to FIGS. 8 and 11, the current flow discharge path in each driver 804-806 includes a shunt or current measurement resistor shunt resistor 812-814 having a small but known resistance value. A calibration circuit 815 is coupled to the drivers 804-806 and to the power supply 808 and includes a comparator 816-818 respectively coupled to a shunt resistor 812-814 for measuring the voltage generated across the shunt resistors 812-814 in response to turning on the switches 811 and discharging the stored energy in the discharge capacitors 810. The non-inverting (e.g., positive) inputs of the comparators 816-818 are coupled to the positive node of the shunt resistors 812-814. The inverting (e.g., negative) inputs of the comparators 816-818 are coupled to receive a reference voltage controlled by a controller 819 during the calibration procedure 1100. The controller 819 may control a voltage generation device such as a digital-to-analog controller (DAC) 820 for generation of the reference voltages used in the calibration procedure 1100. In one example, the DAC 820 is a stand-alone component separate from the controller 819 but may be, in other examples, a subcomponent within the controller 819.

The following description of the calibration procedure 1100 describes the procedure as it relates to calibrating a single converter/driver pair (e.g., voltage converter 900 and driver 804). However, it is contemplated that the calibration procedure 1100 may be executed to calibrate multiple converter/driver pairs simultaneously or concurrently.

At step 1101 of the calibration procedure 1100, the value for a target current is set within the controller 819 as a basis for calibrating the charge voltage that yields the target current through the shunt resistor 812. The calibration procedure 1100 may begin at a first target current value of a range of target current values to be calibrated and after calibrating the first target current value may move sequentially through the range of target current values to calibrate the respective charge voltages for each value within the range. Alternatively, calibration of the target current values may occur in an arrangement other than sequential movement through the range of target current values.

As stated above, the resistance value of the shunt resistor 812 is known and may be a small value (e.g., 1 milliohms, 5 milliohms, 10 milliohms, etc.) to reduce its effects in the flow of current through the LED string 804 during an illumination pulse. Based on the known resistance value, the flow of the target current through the shunt resistor 812 can be expected to generate a specific voltage across the shunt resistor 812 during the illumination pulse. At step 1102, the DAC 820 is controlled to output a reference voltage for the comparator 816 that matches the expected target voltage to be generated across the shunt resistor 812 in response to the target current flowing therethrough. By finding the charge voltage that causes the specific voltage across the shunt resistor 812 to be generated, the charge voltage can also be expected to cause the target current to flow through the LED string 801.

The flow of the target current through the LED string 804 may be expected to generate a specific voltage across the LED string. However, as indicated herein, variances of the internal resistances of the light sources in the LED string due to age and temperature and other factors may cause the actual voltage generated across the LED string to be greater than or less than the expected specific voltage. Based on the expected voltage to be generated, the calibration procedure 1100 may start by testing charge voltage values below the expected specific voltage and increasing the testing charge voltage by incremental steps to work up to the charge voltage that results in the expected current through the shunt resistor 812. Accordingly, at step 1103, a first test charge voltage value is determined and set for the voltage converter 900. The controller 819 may communicate with the controller 904 of the power supply 808 to set the output charge voltage, $V_{charge\_1}$, to the first test charge voltage. Alternatively, the controller 819 may be configured to control the controller 904 directly for setting the output charge voltage.

At step 1104, the discharge capacitor 810 is charged based on the test charge voltage. After a sufficient charging time for the discharge capacitor 810 to store the test charge voltage, an illumination pulse may be transmitted to the trigger 608 at step 1105 via the signal 610 to turn on the switch 811 to discharge the stored energy through the LED string 801 and the shunt resistor 812 during the on time of the illumination pulse. At step 1106, the controller 904 senses, via the comparator 816, whether the voltage generated in the shunt resistor 812 in response to the stored energy discharge has been detected. If the shunt resistor voltage is below the reference voltage 1107, the controller 904 fails to sense the shunt resistor voltage. Accordingly, the test charge voltage is modified (e.g., increased) at step 1108, and procedure 1100 returns to step 1103 to iterate a subsequent test (e.g., steps 1103-1106) based on the modified test charge voltage. If the shunt resistor voltage is at or above the reference voltage 1109, the comparator 816 registers the detection of the shunt resistor voltage, and the controller 904 senses the comparator's registration. The value of the test charge voltage that causes the comparator 816 to register the detection of the shunt resistor voltage may be inserted into or updated (step 1110) in a lookup table 821 correlating target current values with corresponding charge voltage values that yield the target current values. The lookup table 821 may be a shared memory device accessible by the controller 819 and the power supply 808 or may be internal memory of either the controller 819 or the power supply 808 and shared with the other.

At step 1111, the procedure 1100 determines whether additional charge voltages should be tested for the active LED string/driver pair. While a charge voltage that provides at least the target current through the shunt resistor 812 has been detected in step 1106, testing additional charge voltages may fine tune the calibration further to identify a charge voltage closer to the ideal charge voltage that yields the target current. For example, after the output target voltage has been detected by the shunt resistor 812 by a given test charge voltage, a subset of test charge voltages between the given test charge voltage that yielded the identified output target voltage and the highest test charge voltage that yielded no detection of the output target voltage may be used to narrow a difference between the charge voltage to be stored in the lookup table 821 and the ideal charge voltage. Accordingly, if additional charge voltages are to be tested 1112, the test voltage value is modified at step 1108, and procedure 1100 returns to step 1103 to iterate a subsequent test (e.g., steps 1103-1106) based on the modified test charge voltage.

If no additional charge voltages are to be tested 1113, the procedure 1100 determines (step 1114) whether additional target currents are to be tested. Additional target currents may be calibrated to account for additional target illumination outputs of the light sources in the lookup table 821. In this manner, the lookup table 821 may be filled out with a plurality of target current/charge voltage correlations for different desired illuminations of the target area 503. To calibrate additional target currents 1115, the value for the next target current is modified or set at step 1116, and the procedure 1100 returns to step 1102 to calibrate the charge voltage to be correlated with the target current (e.g., steps 1102-1112) based on the modified test charge voltage. If no additional target currents are to be calibrated 1117, the procedure 1100 ends 1118.

The calibration procedure 1100 may be executed for each LED string/driver pair (e.g., 801/804, 802/805, 803/806) independently or concurrently as stated herein. The controller 819 may be configured to re-calibrate the current/charge voltage relationships based on a fixed time interval (e.g., every hour, day, week, month, year, etc.) or based on a random time interval. The frequency of executing the calibration procedure 1100 may refresh the values in the lookup table sufficiently to avoid significant changes in the internal resistance of the light sources in the LED strings 801-803 so that the actual amount of illumination closely matches the expected amount of illumination. Alternatively or in addition to the timed re-calibration, a light sensor 822 may be coupled to the controller 819 and configured to provide an illumination intensity signal to the controller 819 for comparison with an expected illumination intensity of a given current/charge voltage relationship. If a difference between the measured illumination intensity and the expected illumination intensity is greater than a threshold, the controller 819 may perform the calibration procedure 1100 to reduce or eliminate the difference.

When storing data into the lookup table 821, the controller 819 may store temperature data correlated with each target current/charge voltage relationship to account for changes in the relationship affected by temperature. For example, a temperature sensor 823 coupled to the controller 819 allows the controller 819 to record the temperature together with the target current/charge voltage relationships. The target current/charge voltage relationship at a first temperature may yield a first charge voltage for a target current while a second temperature may yield a different charge voltage for the same target current. Accessing the target current/charge voltage relationships in the lookup table 821 by temperature as well as by a desired target current can improve illumination results affected by temperature.

During a machine vision imaging session, a controller such as an image controller 824 (or controller 819, controller 904, or another controller) communicates with the power supply 808 to generate and provide the respective charge voltages to the corresponding drivers 804-806. The charge voltages are acquired from the lookup table 821 based on a desired target current or illumination value desired for acquiring an image via the camera 807. The image controller 824 may also have access to the temperature sensor 823 for further selecting the target current/charge voltage relationship based on the temperature of the environment in which the LED strings 801-803 are placed. The image controller 824 may access the calibration data in the lookup table 821 and instruct the power supply 808 accordingly in one example. In another example, the image controller 824 may instruct the power supply 808 to acquire the data from the lookup table 821 or may instruct the controller 819 to provide the lookup table data to the power supply 808. Based on receiving the target charge voltage(s) for the drivers 804-806, the power supply 808 controls the voltage converters 900-902 to provide the target charge voltage(s) to the drivers 804-806.

After a charge duration in which the discharge capacitors 810 are provided time to store the charge energy provided by the power supply 808, the image controller 824 may send an illumination pulse to the trigger 809 via the signal 610 (FIG. 6) to cause the LED strings 801-803 to illuminate the target area 503 (FIG. 5). The camera 807 may be controlled to start capturing imaging data prior to sending the illumination pulse to capture any illumination data available to the camera during the illumination pulse. After the illumination pulse, the camera 807 may be controlled to complete the image capture.

The voltage converters 900-902 may be controlled to continuously provide the respective target charge voltages so that multiple images may be acquired during the imaging session with the desired illumination without requiring that the lookup table 821 be accessed prior to each image capture. However, it is contemplated that the lookup table 821 may be accessed prior to each image capture.

In addition to calibrating the illumination producible by each LED string as described in FIGS. 8 and 11, the illumination time of each string can be calibrated to reduce differences in the illumination start times among the LED string/driver pairs. Based on the short duration of the on time of the switches 811, a high current may be transmitted through the light sources in the LED strings 801-803 to produce a bright illumination. The duration of the brief pulses of high-current transfer is designed to produce the periods of brief high-intensity light while avoiding burnout of the light sources. Such periods of short high-intensity light may be less effective if a common control pulse sent to each switch 811 of the drivers 804-806 does not yield a synchronous illumination from each of the LED strings 801-803. For example, different respective delays in the switch 811 of the driver 804 and the switch 811 of the driver 805 in transitioning to an on state can cause the LED string 801 to begin its illumination before or after the start of the illumination of the LED string 802. The illumination caused by the driver 804 may overlap a portion of the illumination caused by the driver 805 in one example and may not overlap if the respective delays are too great. A mismatch of illumination of the target area caused by LED string time delay differences can reduce an expected illumination of the target area during the imaging session.

Figure 12:
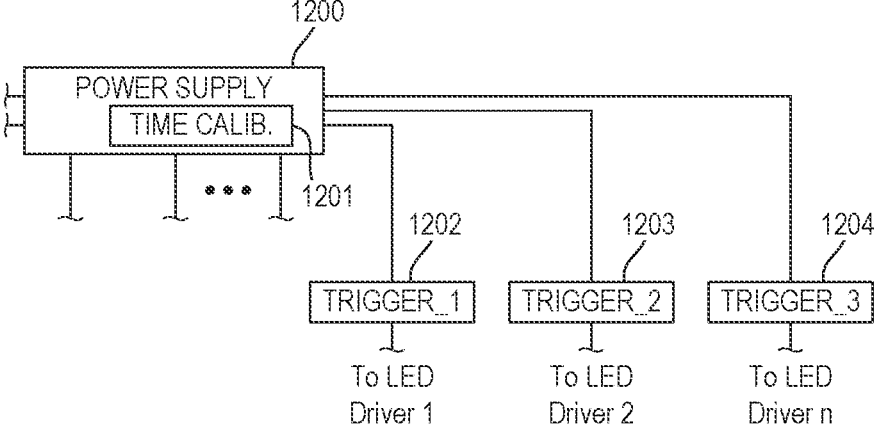
FIG. 12 illustrates a trigger arrangement according to this disclosure.

FIG. 12 illustrates a partial schematic block diagram of a power supply 1200 incorporating time calibrations according to an example. The power supply 1200 includes a time calibration lookup table 1201 populated with timing data that calibrates time delays in sending illumination pulses to respective LED driver triggers 1202-1204 to reduce differences in the resulting LED string illuminations. The time calibration lookup table 1201 may be populated based on a time difference between the start of a trigger pulse sent to the respective triggers 1202-1204 and detecting the start of illumination from the respective LED string driven by the trigger. During the machine vision imaging session, the time calibration data of the time calibration lookup table 1201 may be used to delay transmitting control pulses to the respective triggers 1202-1204 in response to receiving an illumination command. For example, by transmitting a control pulse to a trigger corresponding with a slower-acting driver switch while delaying transmission of the control pulse to a trigger corresponding with a faster-acting driver switch until after a calibrated time value, synchronization of the illumination start times may be achieved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A charge voltage calibration system comprising:
a power supply;
a plurality of light sources coupled in series:
a driver coupled to the power supply and to the plurality of light sources, the driver comprising:
  a capacitor;
  a switch; and
  a sense resistor;
  wherein the switch, the sense resistor, and the plurality of light sources are coupled in series to form a discharge path; and
  wherein the discharge path is coupled in parallel with the capacitor; and
a controller configured to:
  cause the power supply to supply a first charge voltage to the driver; and
  cause the switch to transition from an off state to an on state to discharge at least a portion of a first stored energy in the capacitor through the plurality of light sources.

2. The charge voltage calibration system of claim 1 further comprising:
a digital-to-analog controller (DAC);
a comparator coupled to the DAC and to the sense resistor; and
wherein the controller is configured to control the DAC to provide a reference voltage to the comparator.

3. The charge voltage calibration system of claim 2 further comprising a memory device; and
wherein the controller is configured to store a value of the first charge voltage in the memory device in response to detection by the comparator of a first discharge voltage generated across the sense resistor being greater than or equal to the reference voltage.

4. The charge voltage calibration system of claim 3, wherein the controller is further configured to:
set a target current value;
calculate a target discharge voltage to be generated across the sense resistor based on the target current value; and
control the DAC to provide the reference voltage based on the target discharge voltage.

5. The charge voltage calibration system of claim 4, wherein the target discharge voltage comprises a voltage expected to be generated across the sense resistor in response to a flow of current through the sense resistor equal to the target current value.

6. The charge voltage calibration system of claim 4, wherein the memory device comprises a lookup table; and
wherein the controller, in being configured to store the value of the first charge voltage, is configured to store a correlation of the first charge voltage with the target current value.

7. The charge voltage calibration system of claim 4 further comprising a temperature sensor coupled to the controller; and wherein the controller is further configured to:

receive a temperature value from the temperature sensor; and store a relationship of the temperature value and the first charge voltage in the memory device.

8. The charge voltage calibration system of claim 3, wherein the controller comprises an input coupled to an output of the comparator; and wherein the controller is configured to transmit a comparison signal from the output to the input, the comparison signal indicative of the first discharge voltage being greater than or equal to the reference voltage.

9. The charge voltage calibration system of claim 8, wherein the controller is further configured to store the value of the first charge voltage based on the comparison signal.

10. The charge voltage calibration system of claim 8, wherein the controller is further configured to:

cause the power supply to supply a second charge voltage to the driver in response to the comparison signal indicating that the first charge voltage less than the reference voltage.

11. The charge voltage calibration system of claim 10, wherein the second charge voltage is greater than the first charge voltage.

12. The charge voltage calibration system of claim 10, wherein the controller is further configured to:

cause the switch to transition from the off state to the on state to discharge at least a portion of a second stored energy in the capacitor through the discharge path, the at least a portion of the second stored energy based on the second charge voltage; and store a value of the second charge voltage in the memory device in response to detection by the comparator of a second discharge voltage generated across the sense resistor being greater than or equal to the reference voltage.

13. The charge voltage calibration system of claim 1, wherein the plurality of light sources comprises light-emitting diodes.

14. A method of calibrating illumination generated by a plurality of light sources, the method comprising:

controlling a power supply to output a first charge voltage to a light string driver coupled to the plurality of light sources;

storing a first capacitor voltage in a storage capacitor of the light string driver based on the first charge voltage;

controlling a switch of the light string driver into a conduction state to discharge at least a portion of the first capacitor voltage stored in the storage capacitor through the plurality of light sources, through the switch, and through a sense resistor; and comparing a reference voltage with a resistor discharge voltage, the resistor discharge voltage generated across the sense resistor in response to the discharge of the at least a portion of the first capacitor voltage.

15. The method of claim 14 further comprising, in response to the resistor discharge voltage being greater than or equal to the reference voltage, storing the first charge voltage in a lookup table of a memory device.

16. The method of claim 15 further comprising:

calculating a target resistor discharge voltage to be generated across the sense resistor based on a target current value; and controlling a digital-to-analog controller (DAC) to provide the reference voltage based on the target resistor discharge voltage.

17. The method of claim 16, wherein the plurality of light sources and the sense resistor are coupled in series to create a discharge path; and further comprising calculating a target charge voltage based on an expected voltage to be generated across the discharge path in response to a current flow through the discharge path equal to the target current value.

18. The method of claim 17, wherein the first charge voltage is less than the target discharge voltage.

19. The method of claim 18, wherein, if the resistor discharge voltage is less than the reference voltage, the method further comprises:

controlling the power supply to output a second charge voltage to the light string driver, the second charge voltage greater than the first charge voltage;

storing a second capacitor voltage in the storage capacitor based on the second charge voltage;

controlling the switch into the conduction state to discharge at least a portion of the second capacitor voltage stored in the storage capacitor through the discharge path;

comparing the reference voltage with the resistor discharge voltage generated across the sense resistor in response to the discharge of the at least a portion of the second capacitor voltage; and in response to the resistor discharge voltage being greater than or equal to the reference voltage, storing the second charge voltage in the lookup table.

20. The method of claim 16, wherein storing the first charge voltage in the lookup table comprises storing a relationship of the first charge voltage to the target current value in the lookup table.

* * * * *